United States Patent [19]
Barnhart

[11] Patent Number: 5,875,966
[45] Date of Patent: Mar. 2, 1999

[54] DUAL MODE INPUT SIGNAL CONDITIONER

[75] Inventor: Brian J. Barnhart, New Carlisle, Ohio

[73] Assignee: ITT Manufacturing Enterprises, Inc., Wilmington, Del.

[21] Appl. No.: 813,170

[22] Filed: Mar. 7, 1997

[51] Int. Cl.$^6$ ..................................................... F24F 7/00
[52] U.S. Cl. .................... 236/49.3; 236/DIG. 9; 327/102; 165/202
[58] Field of Search ................. 236/49.3, 74 R, 236/74 A, DIG. 9; 327/100, 102, 104; 417/14, 32; 165/202, 203, 204; 62/180, 186

[56] References Cited

U.S. PATENT DOCUMENTS

| | | | |
|---|---|---|---|
| 5,220,255 | 6/1993 | Alford | 236/DIG. 9 |
| 5,294,048 | 3/1994 | Kawasaki | 236/49.3 |
| 5,294,050 | 3/1994 | Hoffman et al. | 165/202 X |
| 5,492,273 | 2/1996 | Shah | 236/49.3 X |

*Primary Examiner*—Harry B. Tanner
*Attorney, Agent, or Firm*—J. Gordon Lewis

[57] ABSTRACT

An interface for a blower in an automotive vehicle. The interface allows a blower requiring a DC control voltage to be controlled by either (1) a DC control voltage or (2) a Pulse Width Modulated (PWM) signal. The interface converts the PWM signal to a DC voltage.

10 Claims, 5 Drawing Sheets

5,875,966

DUAL MODE INPUT SIGNAL CONDITIONER

FIELD OF THE INVENTION

The invention concerns a signal conditioner which receives one of two input signals, namely, (1) an analog voltage, or (2) a Pulse-Width-Modulated (PWM) digital signal. Irrespective of which input signal is received, the signal conditioner produces one type of output signal, namely, a DC voltage, possibly containing a small ripple.

BACKGROUND OF THE INVENTION

Climate control systems used in the passenger cabins of automotive vehicles can be classified into two types: simple and advanced. The two types use different signals to control the speed of a blower.

In a simple system, blower speed is controlled by an analog voltage which is controlled by the driver of the vehicle. That is, the driver controls blower speed directly. This analog voltage can be produced by a variable resistor.

In an advanced system, a digital control, rather than the driver, controls the blower speed directly. Further, the digital control does so by producing digital signals, rather than analog signals.

It is preferred that both the simple and advanced systems use the same type of blower. One reason is to reduce the number of types of blowers which the manufacturer must maintain in inventory. Clearly, this blower must be controllable by both the digital and the analog signals discussed above.

Interface circuits have been designed to convert both types of signal to a common signal which is intelligible to the blower. However, many of these interface circuits appear to be expensive, as well as subject to errors induced by variations in (1) power supply voltage and (2) ground offset voltages.

OBJECT OF THE INVENTION

An object of the invention is to provide an improved climate control system in an automotive vehicle.

Another object of the invention is to provide a signal conditioner which allows a blower system to be controlled by either a stream of digital signals, or by a variable analog voltage.

SUMMARY OF THE INVENTION

In one form of the invention, a motor requires a DC control signal. The invention receives either a DC signal, or a Pulse Width Modulated (PWM) signal, and produces the required DC control signal in either case.

BRIEF DESCRIPTION OF THE ACCOMPANYING DRAWINGS

DETAILED DESCRIPTION OF THE PREFERRED EMBODIMENTS

One Form of Invention

Figure 1:
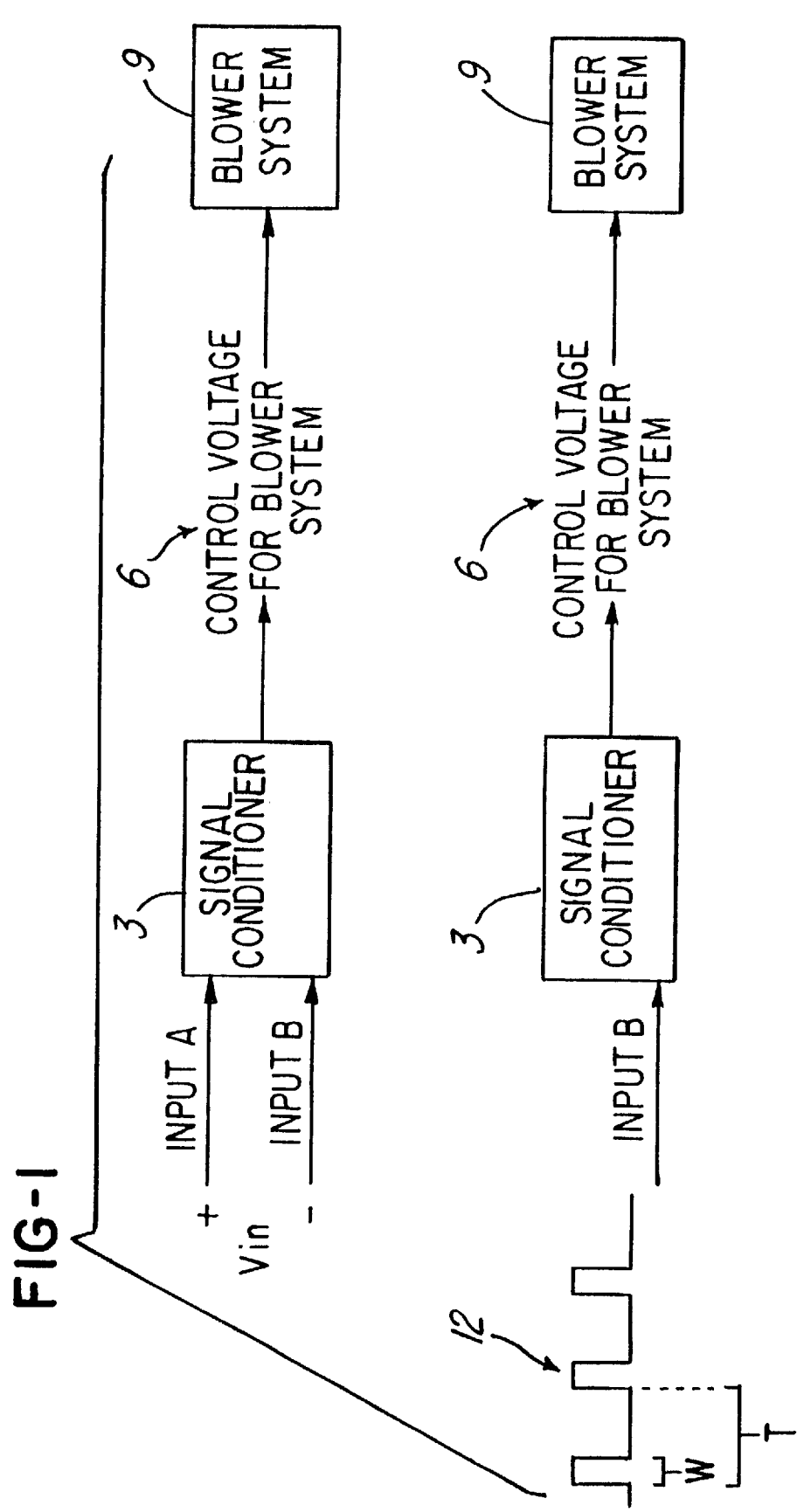
FIG. 1 illustrates one form of the invention.

The top of FIG. 1 illustrates a signal conditioner 3, which receives a DC input voltage Vin, which controls speed of a blower in an automotive vehicle. The input voltage may change over time, such as a few times per hour, or as often as the driver of the vehicle changes the input signal.

In response to the input signal, the signal conditioner 3 produces a control voltage 6. For example, as Vin increases, the signal conditioner 3 produces a correspondingly increasing control voltage 6, which causes the blower system to increase its output of blown air.

The bottom of FIG. 1 illustrates the same signal conditioner 3, but receiving a stream of digital signals 12 as input. These are pulse-width-modulated (PWM) signals, meaning that the information carried by the signal stream resides in the ratio of the width W to the period T.

As that ratio changes, the signal represents different information. Restated, the information is contained in the duty cycle of the pulse stream 12. For example, a wider width W may represent a demand for an increase in blower speed.

The signal conditioner 3 at the bottom of FIG. 1 also produces a control voltage 6 in response to the PWM pulse stream. This control voltage 6 corresponds to that demanded by the particular PWM signal 12 being received. Both control voltages 6 are usable by the blower system 9.

Second Form of Invention

Figure 2:
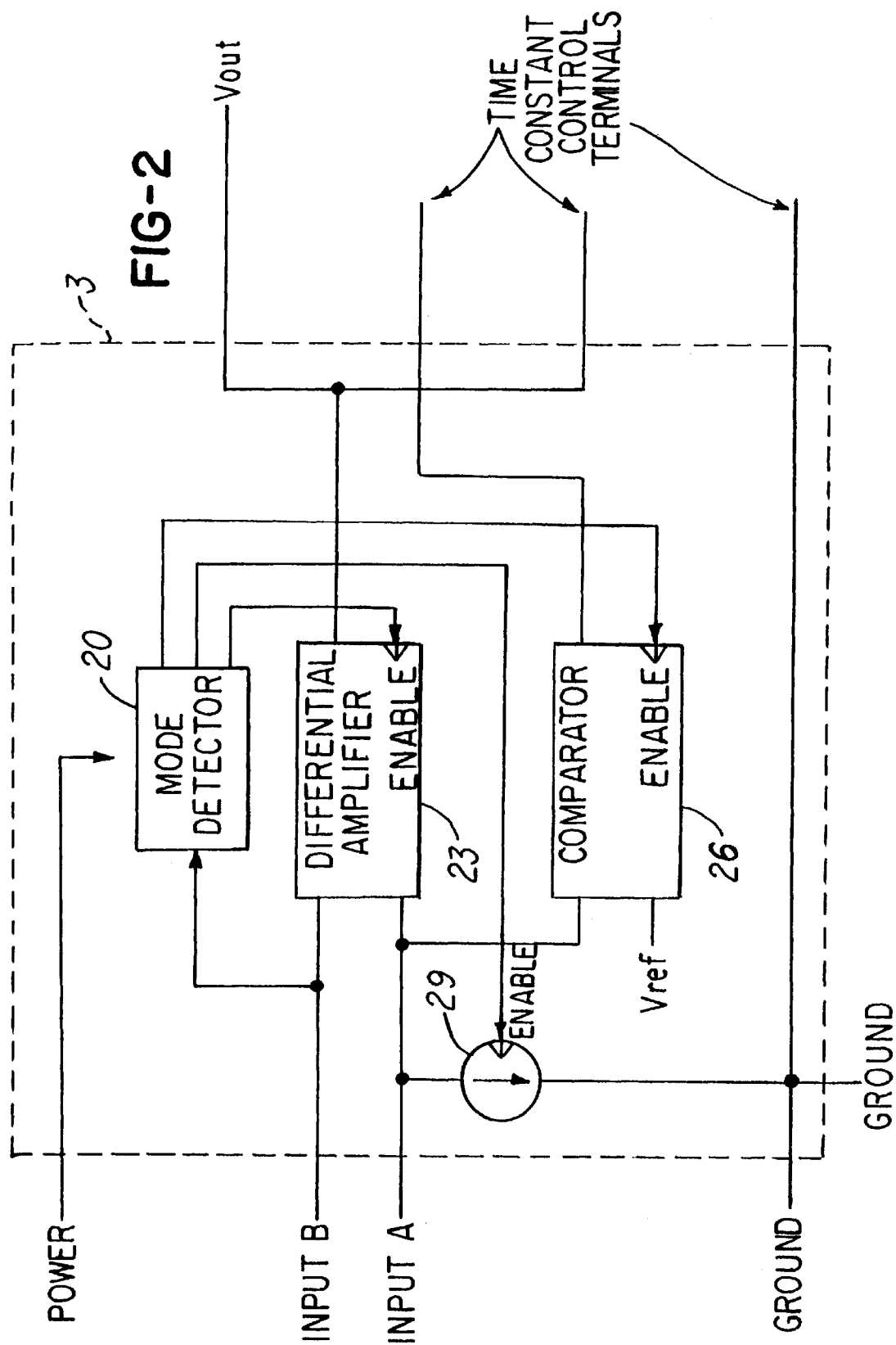
FIG. 2 illustrates one form of the invention in greater detail.

FIG. 2 illustrates one implementation of the signal conditioner 3. It can be fabricated as a printed circuit card, as an integrated circuit, or in any other suitable way. It contains a mode detector 20, which controls which of elements labeled 23, 26, and 29 are activated at any given time. The term "mode" refers to the type of input signal being received, such as a PWM signal or an analog signal.

Analog Mode

Figure 3:
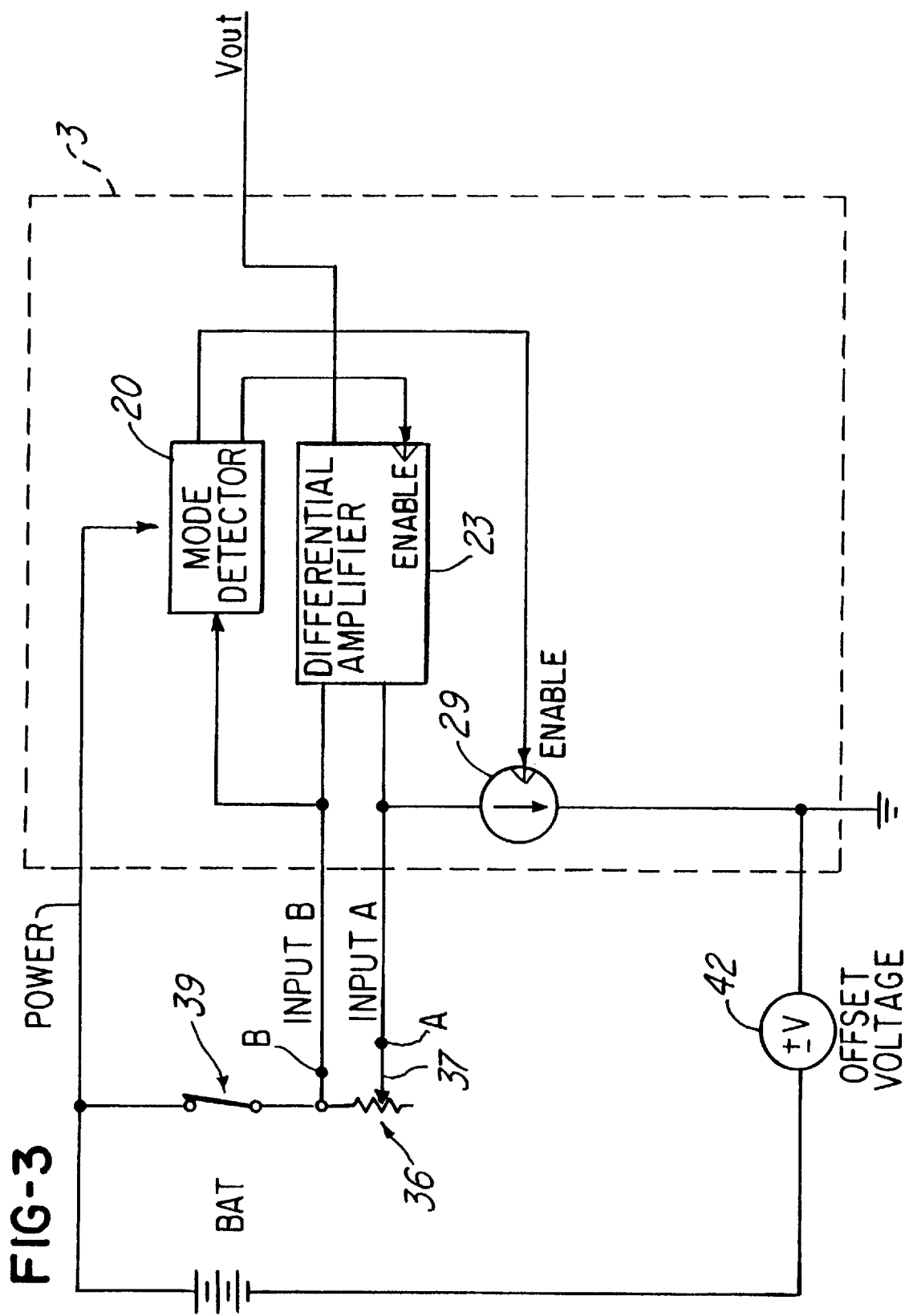
FIG. 3 illustrates the components of FIG. 2 which are utilized when an analog voltage is used as an input signal.

FIG. 3 illustrates those components, within the signal conditioner 3 of FIG. 2, which are used when the signal conditioner 3 receives an analog voltage. FIG. 3 also illustrates external components added to the signal conditioner 3, such as variable resistor 36 and switch 39. The variable resistor 36 produces an analog voltage, which the operator of a vehicle adjusts by adjusting position of the wiper 37. The position of the wiper 37 determines the resistance between inputs A and B.

A current is driven through the variable resistor 36 by a constant current source 29. Constant current sources are known in the art. Since the current through the variable resistor 36 is constant, the voltage between points A and B will be determined by the resistance between those points. This resistance, as stated above, depends on the position of the wiper 37. Thus, the position of the wiper 37 controls the voltage difference between points A and B.

Points A and B represent the two inputs of a differential amplifier 23. The differential amplifier 23 amplifies this voltage difference, and produces an amplified voltage as output Vout. Vout is thus a replica of Vin.

A mode detector 20 causes the components shown in FIG. 3 to become active, and those shown in FIG. 2, but absent in FIG. 3, to become inactive. To do this, the mode detector 20 looks for a DC voltage on line B, which represents that produced by battery BAT, which is the vehicle's primary storage battery. When switch 39 is closed, this voltage is detected by the mode detector 20. In response, the mode detector 20 produces enabling signals which reach the ENABLE inputs of the differential amplifier 23 and of the constant current source 29. Those components shown in FIG. 2 which are absent from FIG. 3 did not receive these enabling signals, and are thus disabled.

The mode detector 20 can operate as a simple comparator. It can compares the voltage on line B with a reference, such as 5 volts. When the former exceeds the latter, the mode detector actuates the ENABLE inputs shown in FIG. 3, and de-activates those shown in FIG. 4.

A significant feature of the apparatus of FIG. 3 is that it reduces the influence of two factors which tend to disturb the output signal Vout. These factors are (1) the fact that the voltage of battery BAT is not constant and (2) the "ground" voltage is not constant, as indicated by the offset voltage 42.

Since the voltage between points A and B depends on (1) the current produced by the constant current source 29 and (2) the value of the resistance between points A and B, the variations in voltage of battery BAT and in the offset voltage 42 do not affect Vout.

From another point of view, these variations serve to increase, or decrease, the absolute voltages of points A and B. However, the difference in voltage between these two points is held constant by the constant current source 29. And the differential amplifier, as its name implies, amplifies the difference in voltage between points A and B. The variations in absolute potential of points A and B do not significantly affect Vout.

PWM Mode

Figure 4:
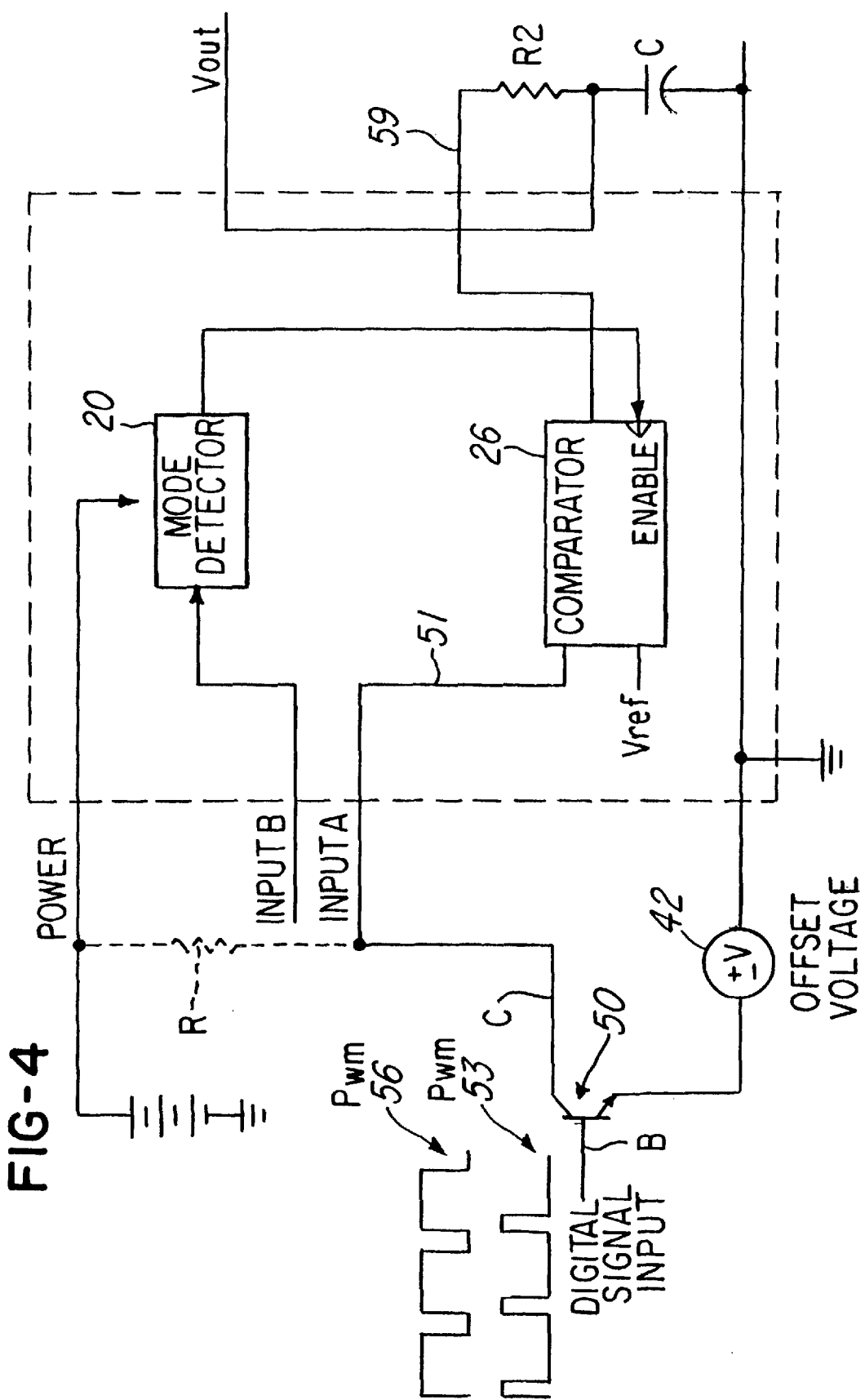
FIG. 4 illustrates the components of FIG. 2 which are utilized when a pulse-width-modulated (PWM) digital signal is used as an input.

FIG. 4 illustrates those components, within the signal conditioner 3 of FIG. 2, which are used when the signal conditioner 3 receives a PWM signal as its input. FIG. 4 also illustrates external components added to the signal conditioner 3, such as transistor 50, resistor R2, and capacitor C.

The variable resistor 36 and switch 39 of FIG. 3 are absent from FIG. 4. With switch 39 absent, the voltage of battery BAT fails to reach the mode detector 20 on INPUT B. The mode detector 20 responds to this absent battery voltage by actuating the ENABLE signal of digital comparator 26, and dis-abling the components shown in FIG. 3, but not in FIG. 4. Thus, the constant current source 29 and differential amplifier 23 of FIG. 3 are disabled.

An NPN bipolar junction transistor 50 is shown receiving PWM signal 53 in FIG. 4. Another PWM signal 56, consisting of wider pulses, is also shown. Significant features of these two pulse streams will be explained in connection with FIG. 5. However, even though two pulse streams are shown, only a single pulse stream is applied to the base B of transistor 50 at any one time. The collector C of this transistor 50 is connected to INPUT A. A pull-up resistor R may be provided, if desired.

Comparator 26 receives the PWM stream from collector C, which is inverted by the action of transistor 50. That is, a high pulse reaching base B is converted to a low pulse reaching line 51; similarly, a low pulse reaching base B is converted to a high pulse reaching line 51;

Comparator 26 compares the voltage of each (inverted) pulse on line 51 with a reference voltage ref. When the former exceeds the latter, the comparator 26 produces an output signal on line 59. Conceptually, for present purposes, the output of comparator 26 can be considered as an inverted replica of the signal on INPUT A, but perhaps changed in amplitude.

This output signal, on line 59, charges the RC network of capacitor C and resistor R2. The charge delivered to capacitor C appears as a voltage Vout. Thus, from one perspective, comparator 26 can be viewed as a current amplifier, or as a buffer. That is, comparator 26 is designed to deliver the appropriate amount of current to capacitor C, which acts as a load on the comparator. However, the component (not shown) producing the PWM stream is not necessarily designed to deliver this type of current.

Figure 5:
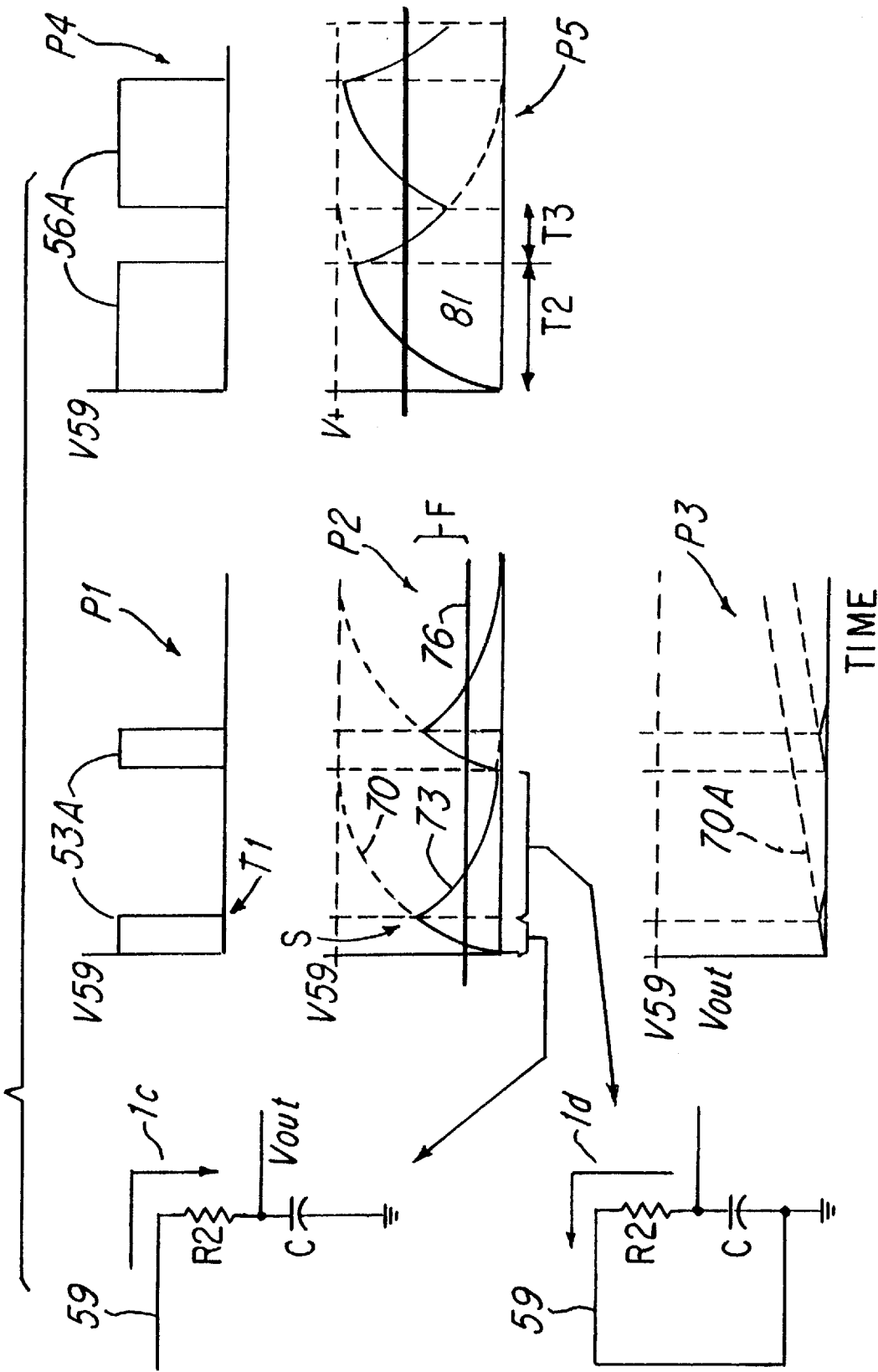
FIG. 5 illustrates derivation of an analog voltage from a PWM signal.

The conversion of the output of comparator 26 (which is not a DC signal, but a stream of pulses) into a voltage usable by the blower system 9 shown in FIG. 1 is illustrated in FIG. 5. The RC network is shown at the left of the Figure. When comparator 26, shown in FIG. 4, produces a high output signal on line 59 in FIGS. 4 and 5, the situation is as shown at the upper left of FIG. 5. A charging current Ic passing through resistor R2 charges capacitor C. When comparator 26, shown in FIG. 4, produces a zero output signal on line 59 in FIGS. 4 and 5, the situation is as shown at the lower left of FIG. 5. A discharging current Id passing through resistor R2 discharges capacitor C.

The plots P1–P5 in FIG. 5 illustrate approximately how this alternate charging and discharging produce an output voltage. Assume that comparator 26 produces narrow pulses 53A in plot P1. (Since they appear as voltage pulses on line 59, the vertical axis of plot P1 is labeled V59.)

When Ic charges capacitor C, the voltage across the capacitor attempts to follow the exponential dashed line 70 in plot P2. However, when the output of comparator 26 drops to zero, at time T1 in plot P1, Ic terminates, and Id now discharges capacitor C. The voltage across capacitor C follows exponential line 73 in plot P2. These two actions repeat, producing the sawtooth voltage indicated in plot P2. This voltage has some average value, indicated by the heavy line 76.

The particular shape of lines such as lines 70 and 73 depend on the RC time constant of resistor R2 and capacitor C (that is, upon the values of R2 and C). If the time constant were increased significantly, the voltage plot would resemble that of plot P3. Line 70 of plot P2 changes to line 70A in plot P3. A much smaller average voltage would exist, which is not specifically shown.

If the width of the pulses increases, as indicated by wider pulses 56A in plot P4, then (1) the time increases during which Ic charges capacitor C, and (2) the time decreases during which Id discharges capacitor C. These times are labeled T2 and T3, respectively, in plot P5. A larger average voltage will exist on capacitor C, as indicated by line 81 in plot 4.

Therefore, the network of resistor R2 and capacitor C converts the pulses produced by comparator 26 into a near-DC voltage. (In practice, the sawteeth shown in the plots of FIG. 5 are very small, so that the voltage on capacitor C can be used as a DC voltage to control a blower motor.)

Additional Considerations

1. The voltage produced by the variable resistor 36 in FIG. 3 is fixed, unless changed by the driver of the vehicle, by moving wiper 37. This voltage can be called a "steady" voltage, because the steady voltage is used to demand a steady blower speed. When the steady voltage changes, the blower speed is also intended to change.

The steady voltage is a DC voltage. Even though the steady voltage occasionally changes, it is not considered an AC voltage. From another point of view, even if the steady voltage is considered an AC signal, there is a maximum expected frequency to that signal. For example, a frequency of 1 Hz would imply that the driver of the vehicle changed the blower speed control every second. This high rate of change is not expected.

Therefore, if the steady voltage is considered as an AC signal, then this signal, during an average trip by a driver, will have a frequency of change of less than 1 Hz.

2. The ripple produced by the capacitor C in FIG. 5 is small. "Ripple" can be defined by an analogy: waves on the ocean represent ripples. The amount of ripple is the ratio between the height of the waves, and the average depth of the ocean (ie, from the bottom of the ocean to the center of the wave, or from the bottom to the surface, when waves are absent). Thus, in an ocean which is 1,000 feet deep when waves are absent, 10-foot waves represent a ripple of 10/1000, or 0.01.

In FIG. 5, the sawteeth S in plot P2 are analogous to the ocean waves, and the average voltage is analogous to the depth of the ocean. Thus, if the fluctuations F in plot P2 are 0.1 volt in size, and the average voltage 76 is 5 volts, then the ripple is 0.1/5.0, or 0.02. Other definitions of ripple are, of course, possible.

Several amounts of ripple are acceptable, such as the following: less than 0.01, less than 0.02, less than 0.03, less than 0.04, less than 0.05, and less than 0.10. Other amounts of ripple are also acceptable.

From another point of view, the RC network in FIG. 5 produces primarily a DC signal 76 in plot P2, upon which is superimposed a very small ripple.

3. The PWM signal of FIG. 1 preferable has a period T in the range of 0.01–0.05 sec. Capacitor C in FIG. 4 preferably has a value in the range of 2–10 microfarad, and resistor R preferably has a value in the range of 50–200 KΩ. The time constant of the RC network is R×C. In comparing this time constant R×C with the period T shown in FIG. 1, and also indicated in FIG. 5, a simple analysis can illustrate how fast, or how slow, capacitor C charges, and thus provides an alternate measure of the ripple found in an embodiment.

4. The current through the constant current source 29 in FIG. 3 is preferably constant to within ±6 percent. Thus, the voltage across the variable resistor will also be held constant to this percentage, thereby holding Vout constant to within this percentage. Consequently, despite the fact that voltage of the battery BAT in FIG. 3 experiences changes which are larger than this percentage, blower speed will be held constant to this same percentage.

5. In one embodiment, the components shown in FIG. 2 are powered by the battery of the vehicle, but the voltage of this power is regulated by a voltage regulator, or a regulated power supply. In another embodiment, the voltage regulator/power supply is eliminated.

Numerous substitutions and modifications can be undertaken without departing from the true spirit and scope of the invention. What is desired to be secured by Letters Patent is the invention as defined in the following claims.

I claim:

1. For a blower motor which requires a predetermined type of control signal, an interface comprising:
   a) a first system for receiving a steady voltage, and producing the predetermined type of signal in response; and
   b) a second system for receiving a PWM signal, and producing the predetermined type of signal in response.

2. Interface according to claim 1, and further comprising a detector for detecting whether the steady voltage is being received and, if so,
   i) activating the first system, and
   ii) de-activating the second system.

3. Interface according to claim 2, in which the detector de-activates the first system, and activates the second system, when the steady voltage is not being received.

4. An interface for providing a control signal for a blower in an automotive vehicle, comprising:
   a) input means for receiving either
      i) a voltage under control of a driver of the vehicle; or
      ii) a PWM signal produced by a digital control; and
   b) output means for
      i) producing a DC voltage in response to the control voltage; and
      ii) producing a digital signal stream for receipt by a smoothing capacitor, in response to the PWM signal.

5. A circuit for providing a control voltage for a blower in an automotive vehicle, comprising:
   a) a first circuit for receiving a DC input voltage and producing said control voltage in response;
   b) a second circuit for receiving a PWM input signal, and producing said control voltage in response; and
   c) a mode selector for selectively actuating either the first or second circuit.

6. Circuit according to claim 5, wherein the first circuit comprises a constant current source, a variable resistor, and a differential amplifier, and wherein the constant current source produces a voltage in the variable resistor, which voltage acts as input to the differential amplifier, which produces the control voltage.

7. Circuit according to claim 5, wherein the second circuit comprises a digital comparator which receives the PWM signal and delivers an output signal to a smoothing capacitor, thereby producing the control signal.

8. Circuit according to claim 5, and further comprising a detector for determining whether the DC input voltage is being received.

9. An interface for a blower in an automotive vehicle, comprising:
   a) a differential amplifier, having
      i) two inputs, connecting to respective terminals A and B; and
      ii) a connection to a first output terminal;
   b) reference means for generating a reference voltage;
   c) a digital comparator, having
      i) two inputs, one connected to terminal A, and the other connected to the reference voltage; and
      ii) a connection to a second output terminal; and
   d) a constant current source for drawing current from terminal B;
   whereby two operating modes are possible, including
      1) a first mode, wherein
         A) a variable resistor is connected between terminals A and B,
         B) a DC power supply is connected to terminal B, and
         C) the first output is connected to a blower speed control and wherein the differential amplifier produces a replica of the voltage between terminals A and B at the first output; and
      2) a second mode, wherein
         A) an input PWM signal is applied to terminal B;
         B) a capacitor is connected between the second output and ground; and C) a resistor is connected between the first and second outputs; and wherein the digital comparator produces an output PWM signal in response to the input PWM signal, and the resistor and capacitor smooth the PWM signal into a signal having an average DC voltage with a ripple.

10. A system for providing a demand signal which demands a blower speed in a vehicle, comprising:
 a) a resistor having a resistance which is variable by an operator of the vehicle;
 b) means for driving a substantially constant current through the resistor to produce a substantially constant voltage; and
 c) means for
  i) producing the demand signal from the substantially constant voltage, and
  ii) and holding the demand signal substantially constant, when battery voltage of the vehicle changes.

* * * * *